(12) United States Patent
Choi

(10) Patent No.: US 6,671,029 B1
(45) Date of Patent: Dec. 30, 2003

(54) APPARATUS AND METHOD FOR EXHAUSTING LIQUID CRYSTAL MATERIAL FROM A LIQUID CRYSTAL DISPLAY BY HEATED AIR

(75) Inventor: Choul Min Choi, Pusan-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 161 days.

(21) Appl. No.: 09/697,299

(22) Filed: Oct. 27, 2000

(30) Foreign Application Priority Data

Oct. 30, 1999 (KR) .......................... 1999-47708

(51) Int. Cl.[7] .......................................... G02F 1/1341
(52) U.S. Cl. .................... 349/189; 349/161; 349/187
(58) Field of Search ........................ 349/153, 161, 349/187, 188, 189, 190, 199

(56) References Cited

U.S. PATENT DOCUMENTS

| 5,417,257 | A | * | 5/1995 | Shimamune et al. ......... 141/11 |
| 5,963,289 | A | * | 10/1999 | Stefanov et al. ............ 349/187 |
| 6,005,653 | A | * | 12/1999 | Matsuzawa ................. 349/153 |
| 6,095,203 | A | * | 8/2000 | Yamamoto et al. ............ 141/59 |
| 6,128,066 | A | * | 10/2000 | Yokozeki ..................... 349/187 |
| 6,211,938 | B1 | * | 4/2001 | Mori .......................... 156/109 |
| 6,337,730 | B1 | * | 1/2002 | Ozaki et al. ................ 349/156 |
| 6,452,650 | B1 | * | 9/2002 | Nakao et al. ................. 349/86 |

* cited by examiner

Primary Examiner—Tarifur R. Chowdhury
Assistant Examiner—P. R. Akkapeddi
(74) Attorney, Agent, or Firm—McKenna Long & Aldridge LLP

(57) ABSTRACT

An apparatus and method for fabricating a liquid crystal display that is capable of shortening a liquid crystal exhaust time in a liquid crystal injection and sealing process to improve the productivity of the liquid crystal display. In the apparatus and method, a heater heats a high-pressure air pressurizing the upper plate and the lower plate of the liquid crystal display panel to heat and pressurize the upper plate and the lower plate of the liquid crystal display panel. Accordingly, the liquid crystal is heated when it is exhausted by the pressurization to have a low viscosity, so that a liquid crystal exhaust time can be shorted to improve the productivity of the liquid crystal display.

27 Claims, 8 Drawing Sheets

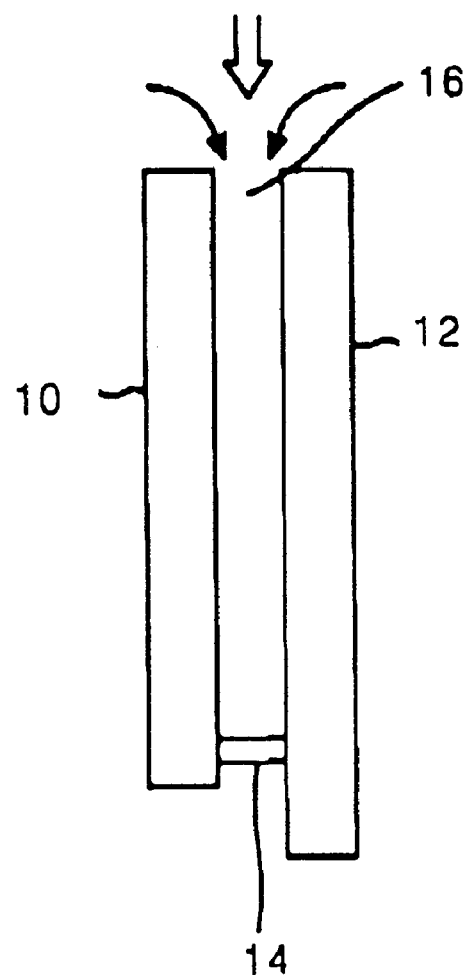

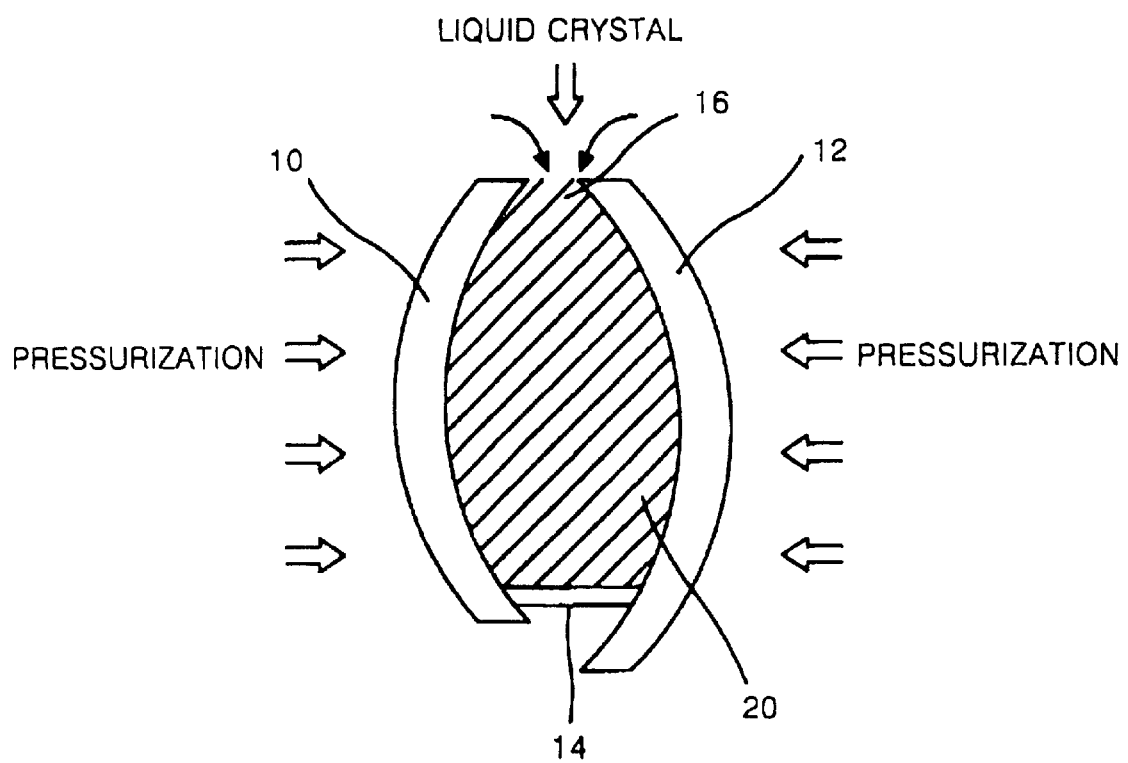

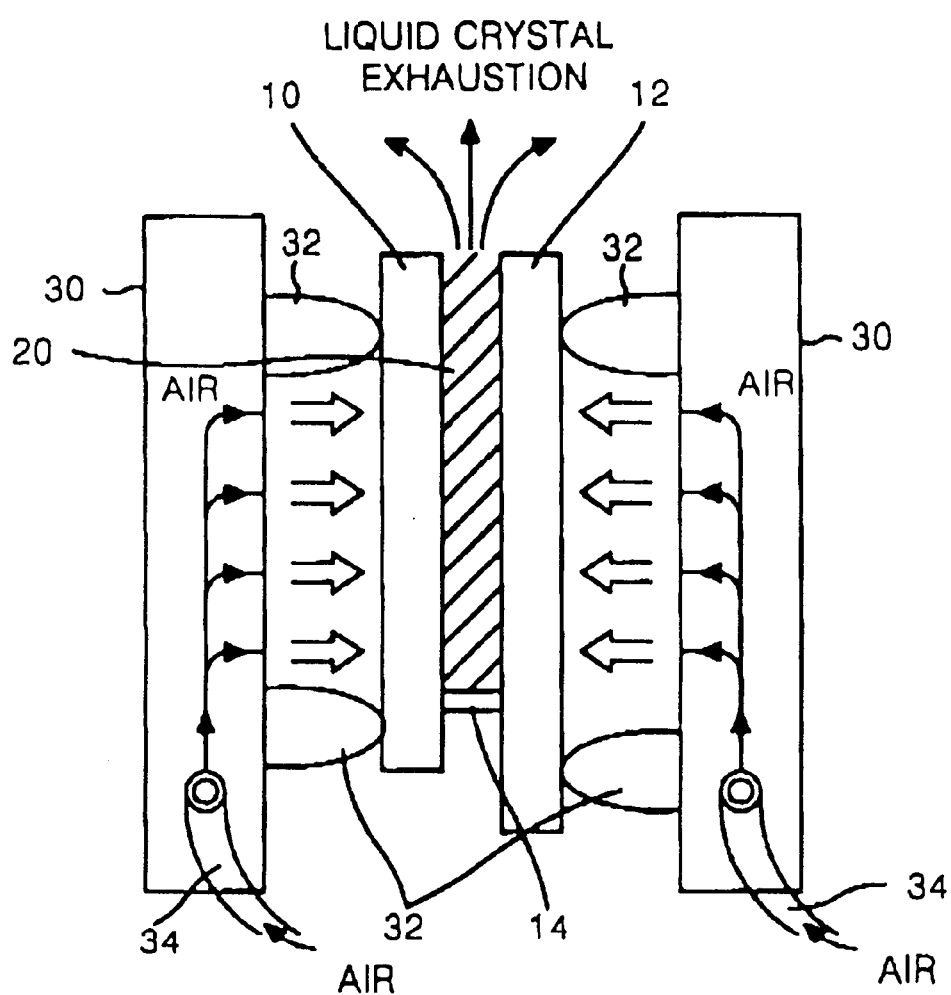

APPARATUS AND METHOD FOR EXHAUSTING LIQUID CRYSTAL MATERIAL FROM A LIQUID CRYSTAL DISPLAY BY HEATED AIR

BACKGROUND OF THE INVENTION

1. Field of the Invention

This invention relates to a liquid crystal display, and more particularly to an apparatus and method for fabricating a liquid crystal display that is capable of shortening a liquid crystal exhaust time in a liquid crystal injection and sealing process to improve the productivity of the liquid crystal display.

2. Description of the Related Art

Generally, a liquid crystal display (LCD) panel is completed by carrying out various processes such as a process of fabricating the upper plate and the lower plate of the panel accompanying a formation process of a liquid crystal cell, a formation and rubbing process of an orientation film for orientating the liquid crystal, a process of assembling the upper plate to the lower plate, and a process of injecting and sealing the liquid crystal between the assembled upper plate and lower plate. The process of fabricating the lower plate includes a formation step of a thin film transistor (TFT) part and a formation step of other electrode part according to a process of coating and etching an electrode material, a semiconductor layer and an insulating film on a substrate. The process of assembling the upper plate to the lower plate includes a forming of a sealant such as an ultraviolet (UV) hardening agent, etc. and hardening by irradiating an ultraviolet ray. The liquid crystal injection and sealing process is finally performed after the upper plate was assembled to the lower plate.

FIG. 1A to FIG. 1C show a general liquid crystal display and sealing process step by step. Referring to FIG. 1A, there are provided an upper plate 10 and a lower plate 12 of a liquid crystal display panel assembled, in parallel, to each other with having a seal part 14. A liquid crystal injection hole 16 is provided at one side end between the assembled upper plate 10 and lower plate 12 to inject a liquid crystal through the liquid crystal injection hole 16. When a liquid crystal has been injected into the panel, the surfaces of the upper plate 10 and the lower plate 12 become convex by a pressure of a liquid crystal 20 as shown in FIG. 1B. This process is referred to as "pressurized sealing". In FIG. 1B, a portion of the injected liquid crystal 20 is exhausted by pressurizing the convex surfaces of the upper plate 10 and the lower plate 12 at the exterior thereof to even the upper plate 10 and the lower plate 12 again. At this time, the liquid crystal 20 is exhausted, via the liquid crystal injection hole 16 into the exterior, and the liquid crystal 20 existing in the inside of the liquid crystal panel is evenly distributed all over the entire area of the panel. Next, in a process shown in FIG. 1C a liquid crystal injection hole 16 is sealed by means of a sealant 18 such as a UV hardening agent, etc. to complete the liquid crystal display panel.

A pressurized sealing of the upper plate 10 and the lower plate 12 shown in FIG. 1B is performed by a pressurizing apparatus as shown FIG. 2. Referring to FIG. 2, a conventional pressurizing apparatus for pressurizing the upper plate 10 and the lower plate 12 after an injection of the liquid crystal 20 in an apparatus of fabricating the liquid crystal display panel includes pressurizing jigs 30 arranged in parallel to be opposed to the upper plate 10 and the lower plate 12 of the liquid crystal display panel, fixing parts 32 attached to the surfaces of the pressurizing jigs 30 opposed to the upper plate 10 and to the lower plate 12 of the liquid crystal display panel to fix the upper plate 10 and the lower plate 12 of the liquid crystal display panel. The liquid crystal display panel, into which the liquid crystal 20 is injected, is arranged between the left and right pressurized jigs 30 and fixed by the fixing parts 32. For instance, in the pressurizing process, an air is exhausted into the surfaces of the upper plate 10 and the lower plate 12 at a high pressure through an air outlet (not shown) provided at the surfaces of the pressurizing jigs 30 opposed to the upper plate 10 and the lower plate 12 of the liquid crystal panel to pressurize the liquid crystal display panel by the high-pressure air. An air input tube 34 for inputting an air from the exterior is provided at one side of each pressurizing jig 30, and an internal tube (not shown) as a path of the inflow air is connected between the air input tube 34 and the air outlet within each pressuring jig 30. The fixing parts 32 are made from a rubber material and play a role to fix the upper plate 10 and the lower plate 12 of the liquid crystal display panel gently for the purpose of preventing the upper plate 10 and the lower plate 12 from being damaged and to provide seal spaces between the upper and lower plates 10 and 12 of the liquid crystal display panel and the pressurizing jigs 30 for the purpose of preventing a high-pressure air from being leaked into the exterior thereof upon pressurizing operation.

In the conventional fabricating method of pressuring the upper plate 10 and the lower plate 12 of the liquid crystal display panel injected with the liquid crystal 20 using the pressurizing apparatus as mentioned above, a work for exhausting the liquid crystal 20 into the exterior by the pressurization requires a considerable time. Particularly, in the case of using a vertical alignment liquid crystal or a high-viscosity liquid crystal, a liquid crystal exhaust time according to the pressurization becomes very long because of a viscosity of the liquid crystal 20. Such a time consumption in the liquid crystal exhaust work results in a factor deteriorating the productivity of the liquid crystal display panel.

SUMMARY OF THE INVENTION

Accordingly, it is an object of the present invention to provide an apparatus and method of fabricating a liquid crystal display that is capable of shortening a liquid crystal exhaust time in a liquid crystal injection and sealing process to improve the productivity of the liquid crystal display.

In order to achieve these and other objects of the invention, a liquid crystal display fabricating apparatus according to one aspect of the present invention includes heating means for heating an air pressurizing the upper plate and the lower plate of the liquid crystal display panel.

A pressurizing apparatus for exhausting a liquid crystal of a liquid crystal display device includes: jigs arranged in parallel to a first and second substrates of the liquid crystal display device, the liquid crystal display device being injected the liquid crystal; fixing parts attached to the jigs; air outlets provided on the jigs; air input tubes provided on one sides of the jigs, the air input tubes being applied a heated air from an exterior; and interior tubes connected between the air input tubes and the air outlets, the heated air being heated the surfaces of the first and second substrates from the interior tubes.

A pressurizing apparatus for exhausting a liquid crystal of a liquid crystal display device includes: jigs arranged in parallel to a first and second substrates of the liquid crystal display device, the liquid crystal display device being injected the liquid crystal; fixing parts attached to the jigs; air outlets provided on the jigs; air input tubes provided on one sides of the jigs; interior tubes connected between the air input tubes and the air outlets; and heater for heating an air from the air outlets.

A method of fabricating a liquid crystal display according to another aspect of the present invention includes the step of heating an air pressurizing the upper plate and the lower plate of the liquid crystal display panel.

A method of for exhausting a liquid crystal of a liquid crystal display device includes the steps of: injecting the liquid crystal between first and second substrates; providing a pressurizing apparatus on the first and second substrates, the pressurizing apparatus being included jigs, air outlets, air input tubes and interior tubes; pressurizing the first and second substrates by ejecting a high pressure air from the air outlets; heating the first and second substrates by a heated air from the air outlets; and exhausting the liquid crystal from the liquid crystal display device.

BRIEF DESCRIPTION OF THE DRAWINGS

These and other objects of the invention will be apparent from the following detailed description of the embodiments of the present invention with reference to the accompanying drawings, in which:

FIG. 1A and FIG. 1C are schematic section views representing a conventional liquid crystal injection and sealing process step by step;

FIG. 2 is a schematic section view showing a structure of a conventional liquid crystal display fabricating apparatus;

DETAILED DESCRIPTION OF THE PREFERRED EMBODIMENT

Figure 1C:
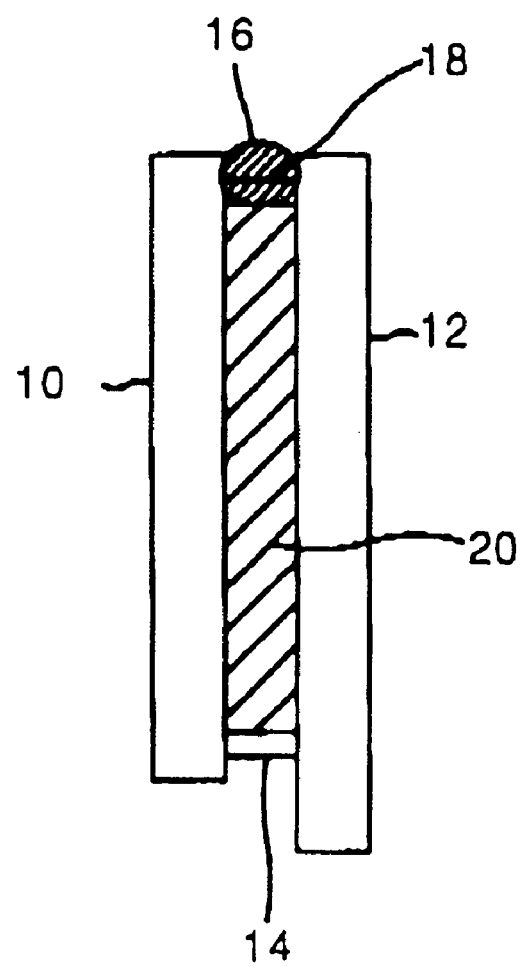
Figure 3:
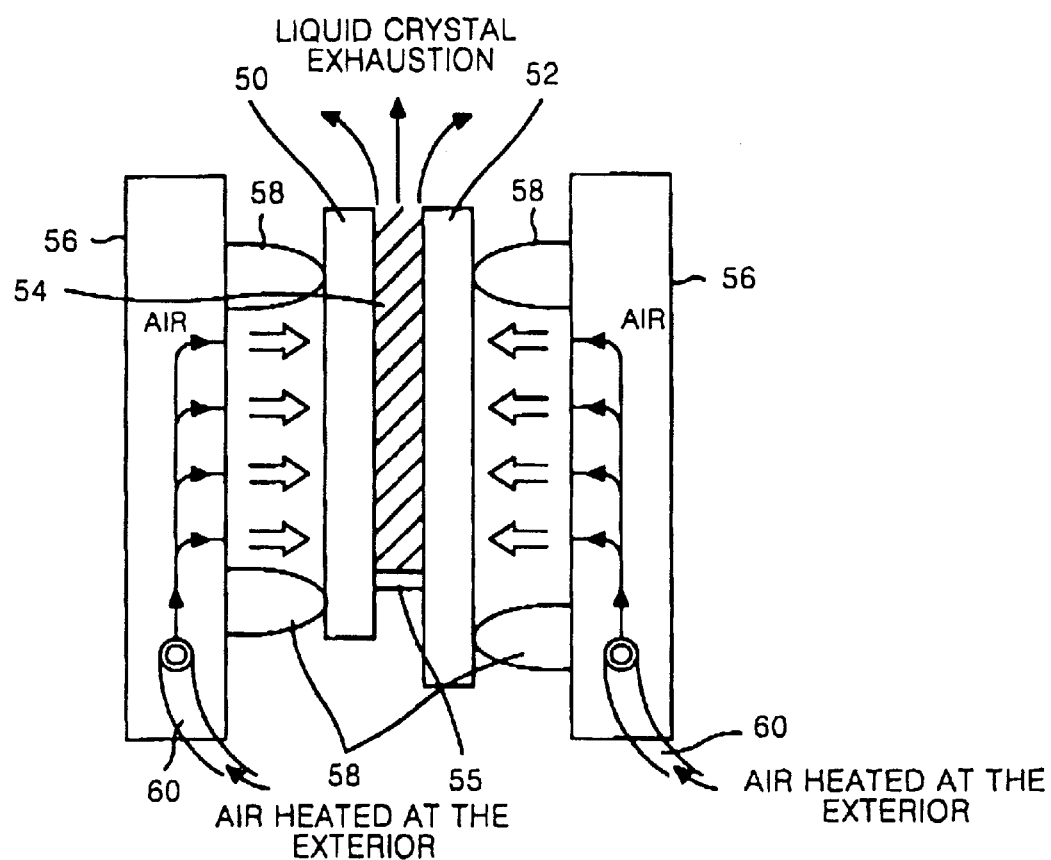
FIG. 3 is a schematic section view showing a structure of a liquid crystal display fabricating apparatus according to a first embodiment of the present invention.

Referring to FIG. 3, there is shown a liquid crystal display device (LCD) fabricating apparatus according to a first embodiment of the present invention. The present LCD fabricating apparatus heats an air pressurizing an upper plate 50 and a lower plate 52 of a liquid crystal display panel to pressurize the surfaces of the upper and lower plates 50 and 52 and applies a heat to the upper plate 50 and the lower plate 52 of the liquid crystal display panel by a high-temperature air. This applies a heat to a liquid crystal 54 injected into the liquid crystal display panel to lower a viscosity of the liquid crystal 54. The present LCD fabricating apparatus includes pressurizing jigs 56 arranged in parallel to be opposed to the upper plate 50 and the lower plate 52 of the liquid crystal panel, fixing parts 58 attached to the surfaces of the pressurizing jigs 56 opposed to the upper plate 50 and the lower plate 52 of the liquid crystal display panel to fix the upper plate 50 and the lower plate 52 of the liquid crystal display panel, air outlets (not shown) provided at the surfaces of the pressurizing jigs 56 opposed to the upper plate 50 and the lower plate 52 of the liquid crystal panel, air input tubes 60 provided at one sides of the pressurizing jigs 56 to input an air from the exterior thereof, and interior tubes (not shown) connected between the air input tubes 60 and the air outlets within the pressuring jigs 56 to provide a path of the inflow air. The present LCD fabricating apparatus has that an air heated at the exterior thereof is applied to the air input tubes 60. The heated air is ejected, via the interior tubes within the pressurizing jigs 56, from the air outlet at a high pressure to pressurize the surfaces of the upper and lower plates 50 and 52 of the liquid crystal display. At this time, the heated air heats the upper plate 50 and the lower plate 52 to apply a heat to the liquid crystal 54 injected into the liquid crystal display panel. The liquid crystal 54 has a decreasing viscosity upon temperature rise to provide a high liquid property. Thus, when the upper plate 50 and the lower plate 52 are pressurized, a liquid crystal exhaust time through the liquid crystal injecting hole becomes much faster than the prior art. The liquid crystal exhaust method employing such a temperature increasing and pressurizing system can reduce a liquid crystal exhaust time into ⅓ in comparison to the prior art method employing only a pressurizing system to short a process time considerably. Accordingly, it becomes possible to improve the productivity of the liquid crystal display panel. According to the present LCD fabricating method, a time reduction effect can be obtained in the case of a model using a vertical alignment liquid crystal or a high-viscosity liquid crystal as well as in the a generally used liquid crystal model.

Figure 4:
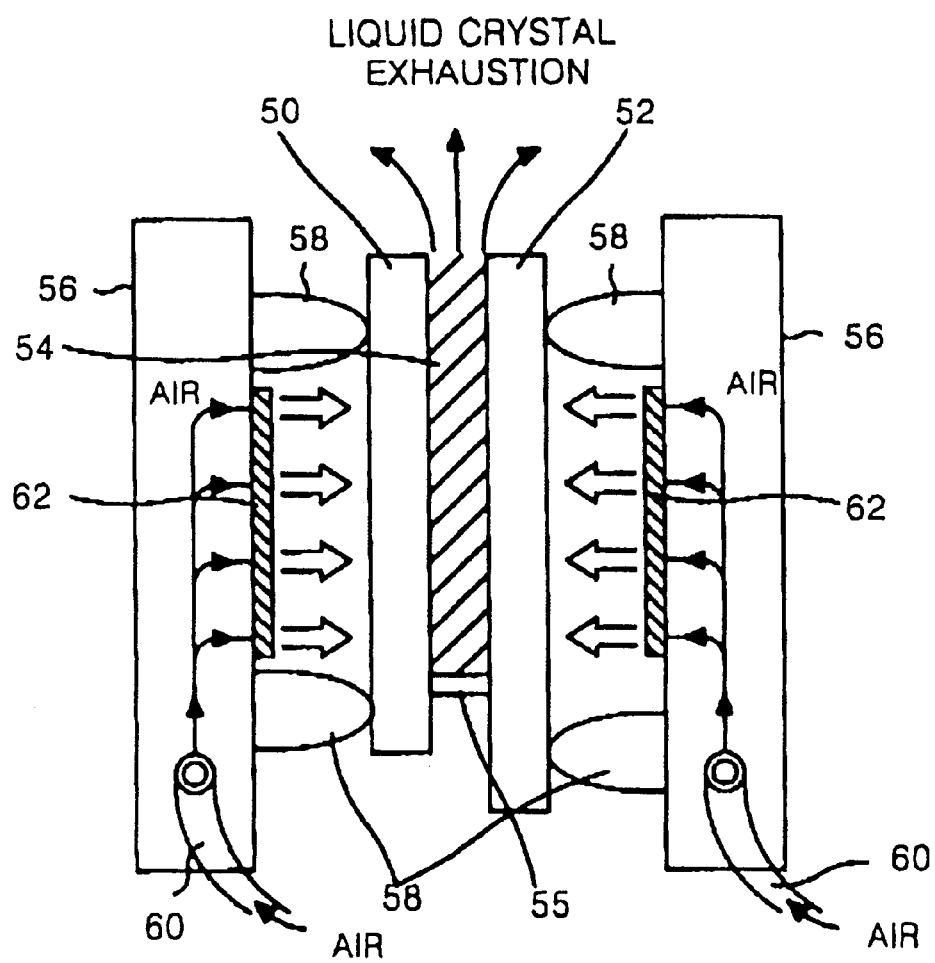
FIG. 4 is a schematic section view showing a structure of a liquid crystal display fabricating apparatus according to a second embodiment of the present invention.

Referring to FIG. 4, there is shown a LCD fabricating apparatus according to a second embodiment of the present invention. This embodiment dose not use an air heated at the exterior thereof, but heats an air when an air is ejected through an air outlet (not shown) at high pressure. To this end, the LCD fabricating apparatus according to the second embodiment includes external heaters 62 mounted on the surfaces of pressuring jigs 56 opposed to an upper plate 50 and a lower plate 52 of a liquid crystal display panel. An air inputted from the exterior is exhausted via interior tubes within the pressurizing jigs 56 and then air outlets of the pressurizing jigs 56 at a high pressure to pressurize the upper plate 50 and the lower plate 52. At this time, an air exhausted from the air outlets is heated by means of the external heater 62. The high-pressure air pressurizes and heats the upper plate 50 and the lower plate 52 of the liquid crystal display panel to transfer a heat into a liquid crystal 54 within the liquid crystal display panel. Thus, a viscosity of the liquid crystal 54 is lowered to shorten an exhaust speed of the liquid crystal 54 when the liquid crystal 54 is exhausted by the pressurization. Accordingly, the productivity of the liquid crystal display panel is improved.

Figure 5:
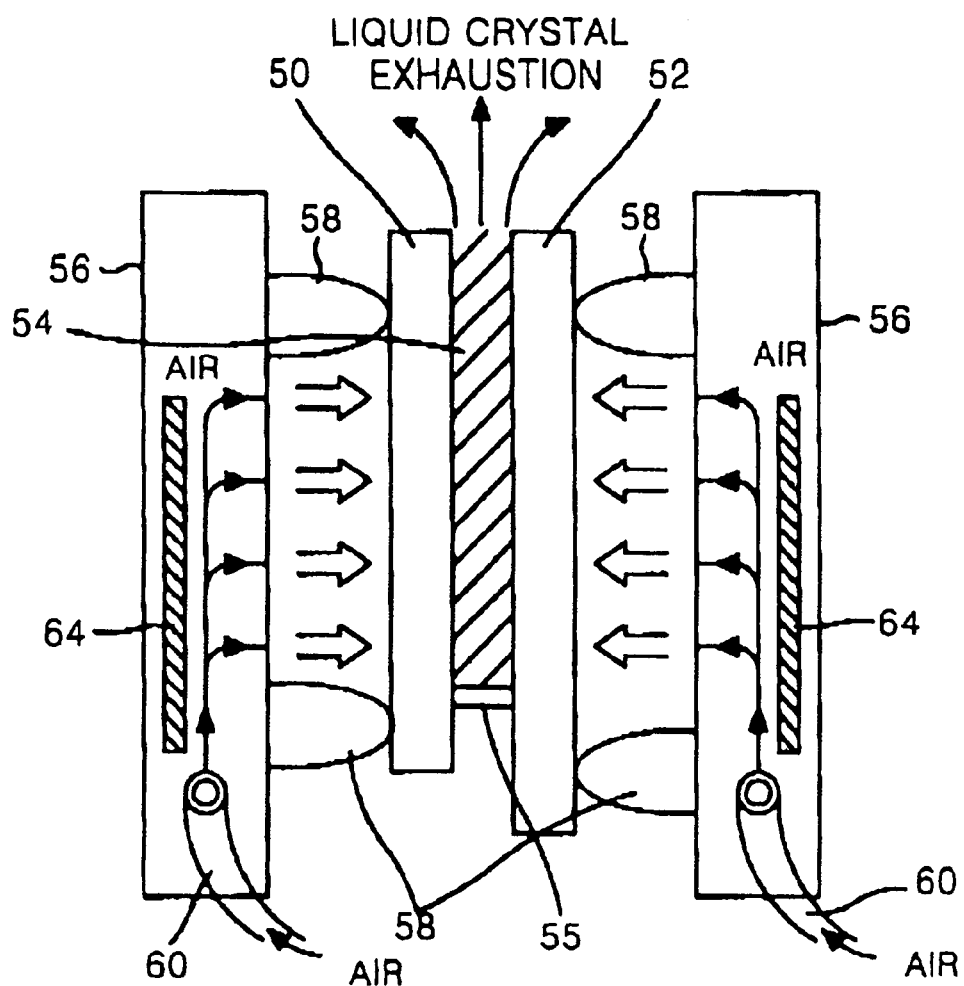
FIG. 5 is a schematic section view showing a structure of a liquid crystal display fabricating apparatus according to a third embodiment of the present invention.

Referring to FIG. 5, there is shown a LCD fabricating apparatus according to a third embodiment of the present invention. The LCD fabricating apparatus according to the third embodiment includes internal heaters 64 arranged adjacently along interior tubes (not shown) as progressing paths of an air within the pressurizing jigs 56. In the course of exhausting an air inputted from air input tubes 60, via the interior tubes, into the air outlets, an air progressing through the interior tubes is heated by means of the internal heaters 64. The heated air is exhausted through the air outlet at a high pressure to pressurize and heat the upper plate 50 and the lower plate 52 of the liquid crystal display panel. Thus, a heat is applied to a liquid crystal 54 injected into the liquid crystal display panel and hence the liquid crystal 54 supplied with a heat has a lowered viscosity to provide a high liquid property. Accordingly, it becomes easy to exhaust the liquid crystal 54 through a liquid crystal injecting hole. Also, a liquid crystal exhaust time is reduced to ⅓ in comparison to the prior art method to improve the productivity of the liquid crystal display panel.

Figure 6:
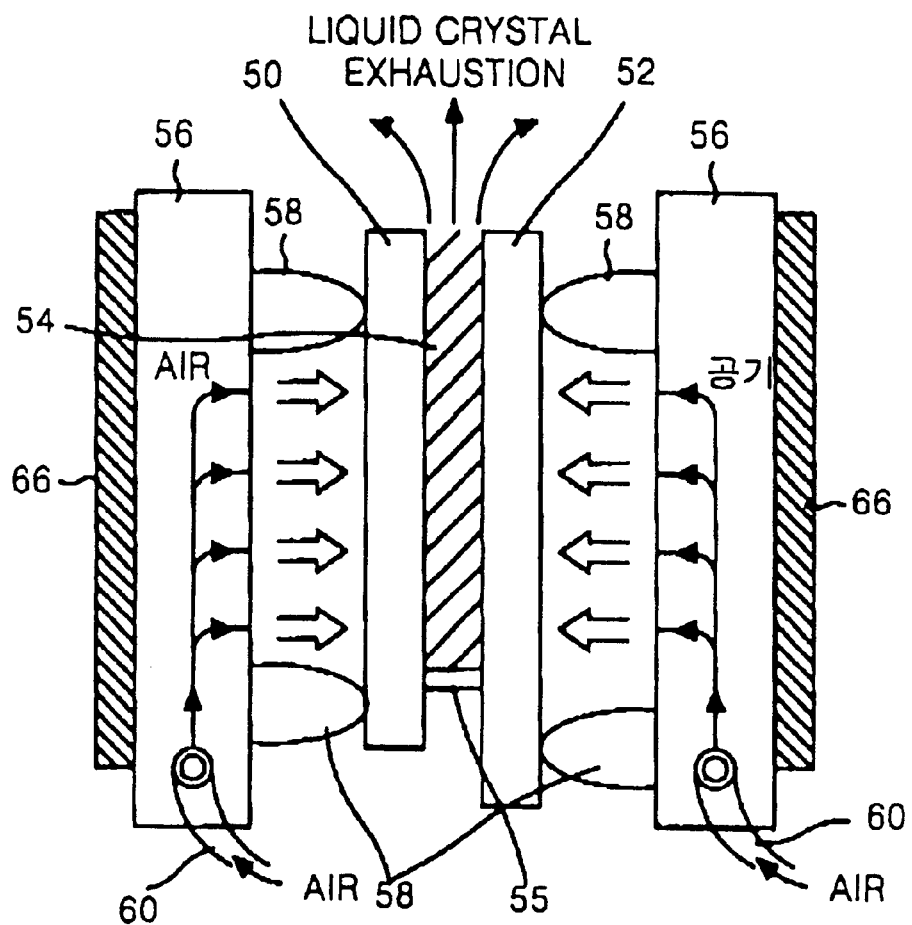
FIG. 6 is a schematic section view showing a structure of a liquid crystal display fabricating apparatus according to a fourth embodiment of the present invention.

Referring to FIG. 6, there is shown a LCD fabricating apparatus according to a fourth embodiment of the present invention. The LCD fabricating apparatus according to the fourth embodiment includes jig-heating heater 66 mounted at the outside of pressurizing jigs 56 to heat the pressurizing jigs 56. In the fourth embodiment, the jig-heating heaters 66 heats the pressurizing jigs 56 for pressurizing a liquid crystal display panel. Since the pressuring jigs 56 they are heated, an air exhausted, via the interior of the pressurizing jigs 56, into air outlets (not shown) also is heated by a heat in the jigs 56. Thus, an air ejected through the air outlets of the pressurizing jigs 56 at high-pressure pressures and heats an upper plate 50 and a lower plate 52 of the liquid crystal display panel. Accordingly, a heat is applied to a liquid crystal 54 injected into the liquid crystal display panel to lower a viscosity of the liquid crystal 54 and thus shorten an exhaust speed of the liquid crystal 54 when the liquid crystal 54 is exhausted by the pressurization. As a result, the productivity of the liquid crystal display panel is improved.

As described above, according to the present invention, an air ejected from the pressurizing jigs at a high pressure to pressurize the upper plate and the lower plate of the liquid crystal display panel is heated to thereby apply a heat to the liquid crystal by way of the upper plate and the lower plate. Accordingly, the heated liquid crystal has a low viscosity to provide a strong liquid property, so that it becomes easier to exhaust the liquid crystal by the pressurization and hence a liquid crystal exhaust time is reduced to ⅓ in comparison to the prior art. As a result, the productivity of the liquid crystal display can be improved.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. An apparatus for fabricating a liquid crystal display wherein a liquid crystal is exhausted by pressurizing an upper plate and a lower plate of a liquid crystal display panel by a high-pressure air ejected from a jig after the liquid crystal was injected into the liquid crystal display panel, said apparatus comprising:
heating means for heating an air introduced into the jig to pressurize the upper plate and the lower plate of the liquid crystal display panel.

2. The apparatus as claimed in claim 1, wherein the heating means is an external heater that heats an air inputted to the jig at the exterior thereof to apply the heated air to the jig.

3. The apparatus as claimed in claim 1, wherein the heating means is an external heater that is mounted to an air outlet of the jig to heat the high-pressure air upon exhausting of the high-pressure air.

4. The apparatus as claimed in claim 1, wherein the heating means is an internal heater that is provided along an interior tube as a progressing path of an air inputted to the jig at the inside of the jig.

5. The apparatus as claimed in claim 1, wherein the heating means is a jig-heating heater that heats the jig itself.

6. A method of fabricating a liquid crystal display wherein a liquid crystal is exhausted by pressurizing an upper plate and a lower plate of a liquid crystal display panel by a high-pressure air ejected from a jig after the liquid crystal was injected into the liquid crystal display panel, said method comprising:
heating an air introduced into the jig to pressurize the upper plate and the lower plate of the liquid crystal display panel.

7. A pressurizing apparatus for exhausting a liquid crystal of a liquid crystal display device comprising:
jigs arranged in parallel to first and second substrates of the liquid crystal display device, the liquid crystal display device being injected with the liquid crystal;
fixing parts attached to the jigs;
air outlets provided on the jigs;
air input tubes provided on one side of the jigs, the air input tubes being applied an air from an exterior;
heating means for heating the air through the air input tubes; and
interior tubes connected between the air input tubes and the air outlets, the heated air being heated the surfaces of the first and second substrates from the interior tubes.

8. The apparatus according to claim 7, wherein the heated air ejects from the air outlets at a high pressure and pressurize the surfaces of the first and second substrates.

9. The apparatus according to claim 7, wherein the heated air heats the liquid crystal.

10. The apparatus according to claim 7, wherein the liquid crystal exhausts from the liquid crystal device by the heated air and the high pressure.

11. A method of for exhausting a liquid crystal of a liquid crystal display device comprising:
injecting the liquid crystal between first and second substrates;
providing a pressurizing apparatus on the first and second substrates, the pressurizing apparatus being included jigs, air outlets, air input tubes and interior tubes;
heating an air introduced into the jigs;
pressurizing the first and second substrates by ejecting a high pressure and heated air from the air outlets;
heating the first and second substrates by the heated air from the air outlets; and
exhausting the liquid crystal from the liquid crystal display device.

12. The method according to claim 11, wherein the heating step is performed by a heated air from an exterior.

13. The method according to claim 11, wherein the heating step is performed by a heated air from a heater, the heater being mounted on the jigs.

14. The method according to claim 11, wherein the heating step is performed by a heated air from a heater, the heater being provided along the interior tubes in the jigs.

15. The method according to claim 11, wherein the heating step is performed by a heated air from a heater, the heater being mounted at the outside of the jigs.

16. The method according to claim 11, wherein the heating step is performed by a jig-heating heater, the jig-heating heater being heated the jigs.

17. The method according to claim 11, wherein the step of exhausting includes exhausting the liquid crystal by the high pressure and the heated air.

18. The apparatus as claimed in claim 1, wherein the heating means is an external heater that is mounted to an air outlet of the jig to heat the high-pressure air upon exhausting of the high-pressure air.

19. The apparatus as claimed in claim 1, wherein the heating means is an internal heater that is provided along an interior tube as a progressing path of an air inputted to the jig at the inside of the jig.

20. The apparatus as claimed in claim 1, wherein the heating means is a jig-heating heater that heats the jig itself.

21. An apparatus for fabricating a liquid crystal display wherein a liquid crystal is exhausted by pressurizing an upper plate and a lower plate of a liquid crystal display panel by a high-pressure air ejected from a jig after the liquid crystal was injected into the liquid crystal display panel, said apparatus comprising:

heating means for heating an air pressurizing the upper plate and the lower plate of the liquid crystal display panel, wherein the liquid crystal display panel has a temporary injection hole and the liquid crystal is injected and then exhausted through the temporary injection hole.

22. The apparatus according to claim 21, wherein the temporary injection hole is only at one side of the liquid crystal display device.

23. A method of fabricating a liquid crystal display wherein a liquid crystal is exhausted by pressurizing an upper plate and a lower plate of a liquid crystal display panel by a high-pressure air ejected from a jig after the liquid crystal was injected into the liquid crystal display panel, said method comprising:

heating an air pressurizing the upper plate and the lower plate of the liquid crystal display panel, wherein the liquid crystal display panel has a temporary injection hole and the liquid crystal is injected and then exhausted through the temporary injection hole.

24. A pressurizing apparatus for exhausting a liquid crystal of a liquid crystal display device having a temporary injection hole comprising:

jigs arranged in parallel to first and second substrates of the liquid crystal display device, the liquid crystal display device being injected with the liquid crystal;

air outlets provided on the jigs;

air input tubes provided on one side of the jigs, the air input tubes being applied with heated air; and interior tubes connected between the air input tubes and the air outlets, the heated air heating the surfaces of the first and second substrates from the interior tubes, wherein the liquid crystal display panel has a temporary injection hole and the liquid crystal is injected and then exhausted through the temporary injection hole.

25. The pressurizing apparatus according to claim 24, wherein the temporary injection hole is only at one side of the liquid crystal display device.

26. A method of for exhausting a liquid crystal of a liquid crystal display device having a temporary injection hole comprising:

injecting the liquid crystal through the temporary injection hole between first and second substrates;

pressurizing the first and second substrates;

heating the first and second substrates by a heated air; and exhausting some liquid crystal through the temporary injection hole from the liquid crystal display device.

27. The method according to claim 26, wherein the temporary injection hole is only at one side of the liquid crystal display device.

* * * * *